W. A. MACKAY.
SAFETY DEVICE FOR AVIATORS.
APPLICATION FILED AUG. 21, 1912.
1,134,884.
Patented Apr. 6, 1915.
2 SHEETS—SHEET 1.
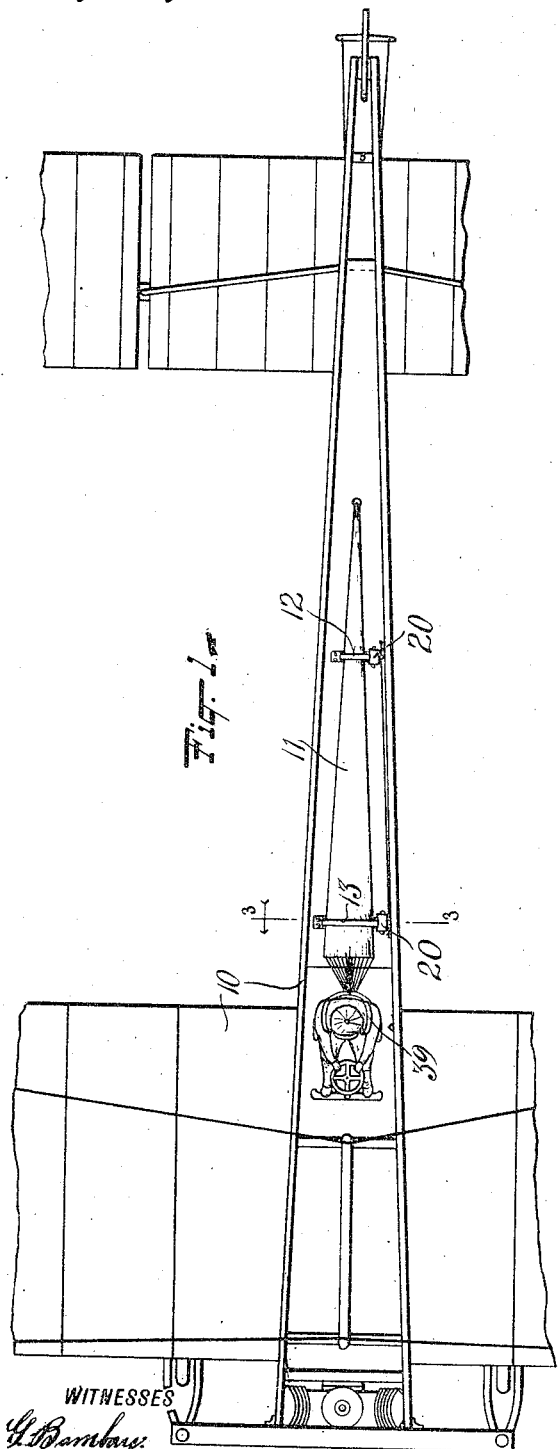
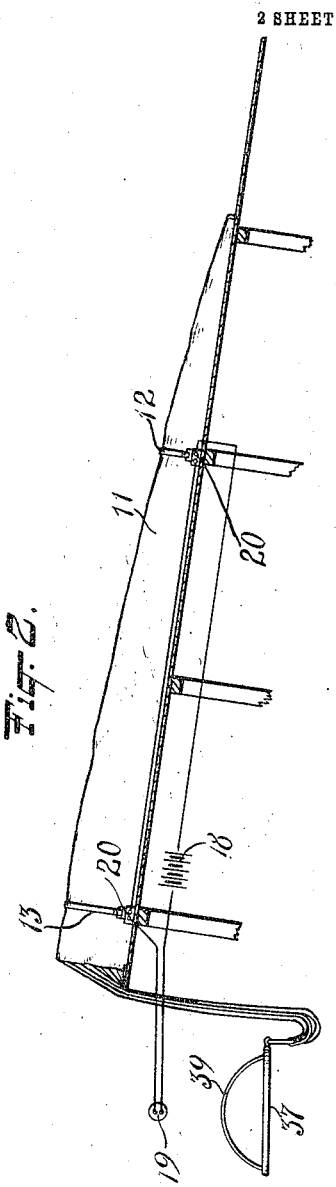
WITNESSES
INVENTOR
William Alexander Mackay.
BY
ATTORNEYS W. A. MACKAY.
SAFETY DEVICE FOR AVIATORS.
APPLICATION FILED AUG. 21, 1912.
1,134,884.
Patented Apr. 6, 1915.
2 SHEETS—SHEET 2.
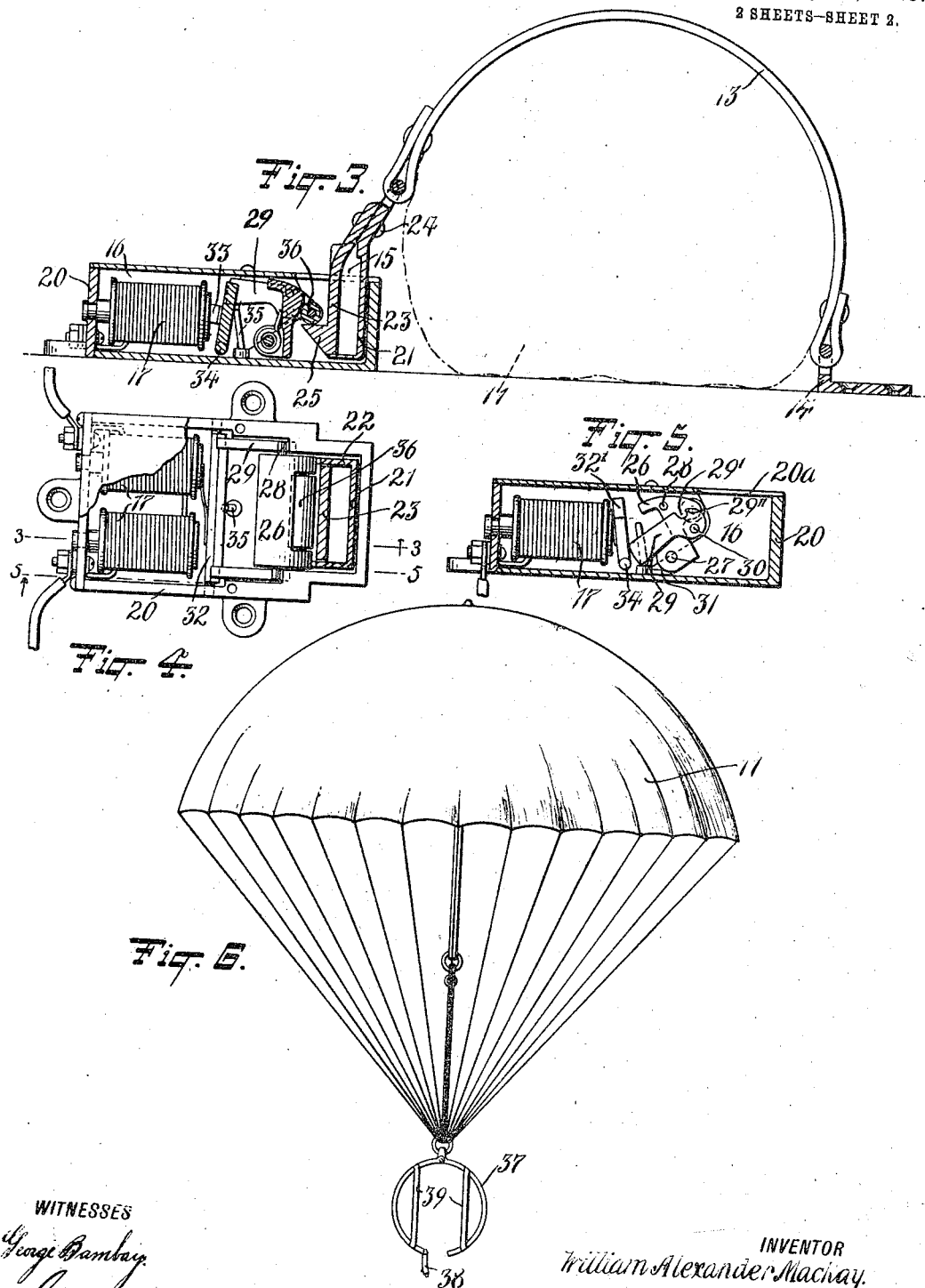
WITNESSES
INVENTOR
William Alexander Mackay.
BY
ATTORNEYS

UNITED STATES PATENT OFFICE.

WILLIAM ALEXANDER MACKAY, OF NORTH SYDNEY, NOVA SCOTIA, CANADA.

SAFETY DEVICE FOR AVIATORS.

1,134,884. Specification of Letters Patent. Patented Apr. 6, 1915.

Application filed August 21, 1912. Serial No. 716,173.

*To all whom it may concern:*

Be it known that I, WILLIAM ALEXANDER MACKAY, a subject of the King of Great Britain, and a resident of North Sydney, in the Province of Nova Scotia and Dominion of Canada, have invented a new and Improved Safety Device for Aviators, of which the following is a full, clear, and exact description.

This invention relates to appliances for use in connection with aeroplanes, and has particular reference to devices for making flights of aviators practically safe in the provision of a parachute adapted to be carried by the machine and to which the aviator is connected, means furthermore being provided whereby the parachute and aviator may be released from the machine in the case of accident and enabling him to be lowered to the earth in safety by virtue of the parachute.

The invention furthermore consists in the novel details of construction whereby the foregoing object may be attained in a simple and thoroughly reliable manner.

The foregoing and other objects of the invention will hereinafter be more fully described and claimed and illustrated in the drawings accompanying this specification in which like characters of reference indicate corresponding parts in all the views, and in which—

Figure 1 is a fragmentary plan view of an aeroplane showing the aviator and parachute in position thereon as in the act of flying; Fig. 2 is a partial transverse section of the machine, and a side elevation of the parachute secured thereto; Fig. 3 is a transverse section through the locking mechanism for securing the parachute to the machine, taken on the line 3—3 of Figs. 1 and 4; Fig. 4 is a plan view of the lock, a portion of the casing being detached, and the catch being shown in section; Fig. 5 is a section of the casing and a side elevation of the interior mechanism, taken on the line 5—5 of Fig. 4; and Fig. 6 is a view of the parachute in operative position.

Referring particularly to the drawings I show at 10 an aeroplane of any usual or suitable design, and secured to any suitable part of the upper portion of the same is a parachute 11 secured to the machine in folded position and maintained in such position by a plurality of straps 12 and 13.

As shown in Fig. 3 each strap 13 is connected at one end permanently to the aeroplane by means of a bracket 14, the other end of the strap being passed around the parachute and provided with a suitable form of catch 15 adapted to be connected with a lock 16 likewise secured to the aeroplane frame. Any suitable means may be provided for releasing the catch 15 from the lock 16, but I prefer to provide electrical means for this purpose including an electro-magnet 17 in each lock coöperating with the catch 15 of each strap, all of the magnets being in the same circuit with battery 18, the circuit of which is adapted to be completed by any suitable means such as a push button 19 within reach of the aviator.

Each lock 16 includes a casing 20 having an opening 20ª adapted to admit the catch 15, as indicated in Fig. 3. The catch 15 includes a housing 21 permanently connected to the outer or free end of the strap and having parallel side flanges 22 extending outwardly from the main wall of the housing 21. The catch also includes a spring tongue 23 riveted at one end at 24 to the housing and having a head or hook 25 at the other end adapted to oscillate within the space between the flanges 22 when the catch is being inserted into the lock.

The lock includes a dog 26 pivoted upon a pin 27 extending transversely across the casing parallel to the opening 20ª of the casing, whereby the dog is adapted to oscillate toward or from the catch and interlock with the aforesaid hook 25. At each end of the dog is a stud 28 adapted to coöperate with a trigger 29 pivoted at 30 in the adjacent side wall of the casing 20. The upper edge of each trigger is provided with a notch 29', whereby, when the dog is thrown outwardly into locking position by means of a spring 31 or its equivalent, the longer ends of the triggers will be lifted so as to permit the armature 32 to be swung beneath the same by operation of a light spring 33. The armature is pivoted transversely in the casing on the pintles 34. When in the position just indicated the armature provides a support for the triggers 29 which rest upon shoulders 32' of the armature, and the triggers by this fact will prevent the dog 26 from swinging on its pivot 27 out of engagement with the catch. The swinging movement of the armature toward the catch is limited by means of a post 35. When the electro-magnets 17 are energized in the manner above indicated, each armature will be drawn against the strength of the spring 33 out of supporting contact with the triggers 29, leaving the triggers free to swing downwardly on their pivots 30, as shown in Fig. 5, and hence leaving the dog 26 free to swing on its pivot 27 when the strap pulls outwardly on the catch to free it from the lock. This action of the straps will take place by reason of the tendency of the parachute to fly open in any well known manner. As soon as the catch is withdrawn from the lock the dog is restored to locking position by virture of the spring 31 and in moving outwardly to such position the studs 28 engage the points or hooks 29" of the triggers, lifting the same to the position shown in Fig. 3. When the magnet is deënergized, the armature, of course, will swing back beneath the longer ends of the triggers, making it impossible for the dog to move away from its locking position.

When assembling the parachute upon the machine the straps 12 and 13 are passed around it and the catches 15 are inserted into the casings, the tongues 23 thereof being sufficiently flexible to permit such insertion without disturbing the position of the dogs. To facilitate the coöperation between the catch and the dog in either direction, one of such members is provided with an antifriction roller 36.

The parachute is shown provided with a belt 37 adapted to be clasped about the aviator's body by means of a catch 38 and may be provided also with shoulder straps 39. Any other suitable means may be provided to attach the parachute to the aviator in any other reliable manner.

While in the air, if the aeroplane becomes unmanageable by reason of the failure of the motor or otherwise, with a result that the aviator's life becomes endangered, he will press upon the button 19, permitting the parachute to be cut loose from the machine in the manner above indicated so that he will not be precipitated in connection with the machine in the way that so frequently has occurred in this practice. If desired, the aviator may be secured to his seat by a locking means of a character similar to the means for securing the parachute in position, and such locking means may be electrically operated and in the same circuit as that above described, whereby he will be unlocked from his seat simultaneously with the freeing of the parachute.

The several parts of this improvement may be made of any suitable materials, and the relative sizes, proportions, and details of arrangement of the same may be varied to a considerable extent without departing from the spirit of the invention.

Having thus described my invention, what I claim as new and desire to secure by Letters Patent is:—

1. The herein described means to secure a parachute detachably to an aeroplane comprising a casing having a side opening near one end, a strap adapted to surround the parachute, a catch connected to one end of the strap and including a rigid housing and a flexible tongue secured at one end of the housing, said catch being adapted to project into said opening and the tongue having a hook projecting laterally from the housing, a locking dog movable within the casing and coöperating with said hook, a trigger having a projection coöperating with the dog while the latter is moving to its locking position and whereby the trigger is moved to hold the dog normally in locking position, and means under the control of the aviator normally holding the trigger in said locking position, substantially as set forth.

2. The herein described means to secure a parachute detachably to an aeroplane comprising a lock casing of rectangular form and having a closed end with an opening in a side adjacent the end, a dog mounted within the casing and held normally in rigid position slightly spaced from said closed end and just within the opening aforesaid but movable away from the end when the lock is released, and a strap including a catch projectable through the said opening in the casing, said catch comprising a rigid housing having a back fitted slidably against said closed end of the casing and also having integral side flanges, said catch also including a flexible tongue secured rigidly to one end of the housing and extending thence between said side flanges and spaced normally from the back of the housing, said tongue carrying a head coöperating with the casing dog, substantially as and for the purposes set forth.

In testimony whereof I have signed my name to this specification in the presence of two subscribing witnesses.

WILLIAM ALEXANDER MACKAY.

Witnesses:
T. J. CROCKETT,
ROBERT BLONE.